US 11,442,278 B1
Sep. 13, 2022

(12) United States Patent
Patnaikuni et al.

(10) Patent No.: US 11,442,278 B1
(45) Date of Patent: Sep. 13, 2022

(54) CONTEXTUAL PERIPHERAL SEGMENTATION

(71) Applicant: INTERNATIONAL BUSINESS MACHINES CORPORATION, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/249,210

(22) Filed: Feb. 24, 2021

(51) Int. Cl.
G02B 27/01 (2006.01)
G02C 7/04 (2006.01)
G06T 19/00 (2011.01)
G06F 1/16 (2006.01)
G02B 27/00 (2006.01)

(52) U.S. Cl.
CPC ..... *G02B 27/0172* (2013.01); *G02B 27/0093* (2013.01); *G02C 7/04* (2013.01); *G06F 1/163* (2013.01); *G06T 19/006* (2013.01)

(58) Field of Classification Search
CPC .. G02B 27/0172; G02B 27/0093; G02C 7/04; G06F 1/163; G06T 19/006
See application file for complete search history.

(56) References Cited

U.S. PATENT DOCUMENTS

| 9,575,321 | B2 | 2/2017 | Osterhout | |
|---|---|---|---|---|
| 10,019,962 | B2 | 7/2018 | Liu | |
| 10,338,407 | B2 * | 7/2019 | Bostick | G03B 17/38 |
| 10,579,140 | B2 | 3/2020 | Border | |
| 10,644,543 | B1 * | 5/2020 | Pang | H02J 50/80 |
| 2014/0375682 | A1 * | 12/2014 | Do | G06F 3/011 345/633 |
| 2016/0091737 | A1 | 3/2016 | Kim | |

(Continued)

OTHER PUBLICATIONS

Disclosed Anonymously, "Method and System for Creation of Obstacle Free Augmented Reality Object from Smart", IP.com No. IPCOM000355669D, Oct. 8, 2018, pp. 1-3.

(Continued)

*Primary Examiner* — Dmitriy Bolotin
(74) *Attorney, Agent, or Firm* — Tihon Poltavets

(57) ABSTRACT

A method for peripheral segmentation of electronic contact lens includes determining a peripheral view for the electronic contact lens based on a user associated with the electronic contact lens and establishing a plurality of segmented areas in the peripheral view of an electronic contact lens, where each of the plurality of segmented areas in the peripheral view is associated with a software application from a plurality of software applications. The method also includes establishing a plurality of rules for accessing content of each software application from the plurality of software applications associated with the plurality of segmented areas and establishing a plurality of rules for accessing content of each software application from the plurality of software applications associated with the plurality of segmented areas. Responsive to displaying, in the electronic contact lens, the content of the first software application, performing an action on the content of the first software application.

20 Claims, 7 Drawing Sheets

(56) References Cited

U.S. PATENT DOCUMENTS

2019/0339529 A1* 11/2019 Malaika ............... G02B 27/017
2022/0078528 A1* 3/2022 Haberman ......... H04N 21/8456

OTHER PUBLICATIONS

Elgan, "Why a smart contact lens is the ultimate wearable", https://www.computerworld.com/article/3066870/why-a-smart-contact-le . . . , May 9, 2016, pp. 1-6.

Mell et al., "The NIST Definition of Cloud Computing", National Institute of Standards and Technology, Special Publication 800-145, Sep. 2011, pp. 1-7.

Wikipedia, "Peripheral Vision", https://en.wikipedia.org/wiki/Peripheral_vision, printed Jan. 4, 2021, pp. 1-8.

Perfectlens, "7 Exciting Developments in the World of Augmented Reality Contacts", https://www.perfectlens.ca/articles/7-exciting-developments-augmented-r . . . , printed Jan. 4, 2021, pp. 1-6.

Sherr, "You've heard of AR glasses, but this startup wants to make them into contact lenses", https://www.cnet.com/news/youve-heard-of-ar-glasses-but-this-startup-w . . . , Nov. 14, 2018, pp. 1-4.

Starr, "Sony patents contact lens that records what you see", https://www.cnet.com/news/sony-patents-contact-lens-that-records-what . . . , May 2, 2016, pp. 1-6.

* cited by examiner

CONTEXTUAL PERIPHERAL SEGMENTATION

BACKGROUND

This disclosure relates generally to electronic contact lens, and in particular to contextual peripheral segmentation for electronic contact lens.

Electronic contact lens, also referred to as smart contact lens, include various microcircuitry for displaying information to a user wearing the electronic contact lens. The microcircuitry can include items such as a semitransparent display and microlens array coupled to an energy storage module that sources power from a solar cell module. Electronic contact lens provide the technologic support for a virtual reality (VR) user experience, without requiring the user to wear a headset or wearable glasses.

SUMMARY

Embodiments in accordance with the present invention disclose a method, computer program product and computer system for peripheral segmentation of electronic contact lens, the method, computer program product and computer system can, responsive to initializing an electronic contact lens, determine a peripheral view for the electronic contact lens based on a user associated with the electronic contact lens. The method, computer program product and computer system can establish a plurality of segmented areas in the peripheral view of an electronic contact lens, wherein each of the plurality of segmented areas in the peripheral view is associated with a software application from a plurality of software applications. The method, computer program product and computer system can establish a plurality of rules for accessing content of each software application from the plurality of software applications associated with the plurality of segmented areas. The method, computer program product and computer system can determine the user of the electronic contact lens is attempting to access content of a first software application from the plurality of software applications associated with a first segmented area from the plurality of segmented areas of the electronic contact lens. The method, computer program product and computer system can, responsive to displaying, in the electronic contact lens, the content of the first software application, perform an action on the content of the first software application.

DETAILED DESCRIPTION

Embodiments of the present invention provide contextual peripheral segmentation of for displaying content in electronic contact lens. The viewing area of an electronic contact includes a central vision area and a peripheral area, where segmentation of the peripheral area allows for content to be displayed in accessible areas of the peripheral area through eye movements performed by a user or through an input on a client device paired to the electronic contact lens. In one example, the peripheral area is divided into quadrants, where each quadrant of the peripheral area is associated with a specific software application. Embodiments of the present invention can display a software application icon in the quadrant of the peripheral area when the user in not interacting with the specific software application. To access the specific software application, the user directs their line of sight from the central vision area to a quadrant and/or the software application icon associated with the specific software application for a determined amount of time, to prevent inadvertently opening of the specific software application through extraneous eye movements. Embodiments of the present invention can display content associated with the specific software application in one or more portions of the viewing area of the electronic contact lens.

Figure 1:
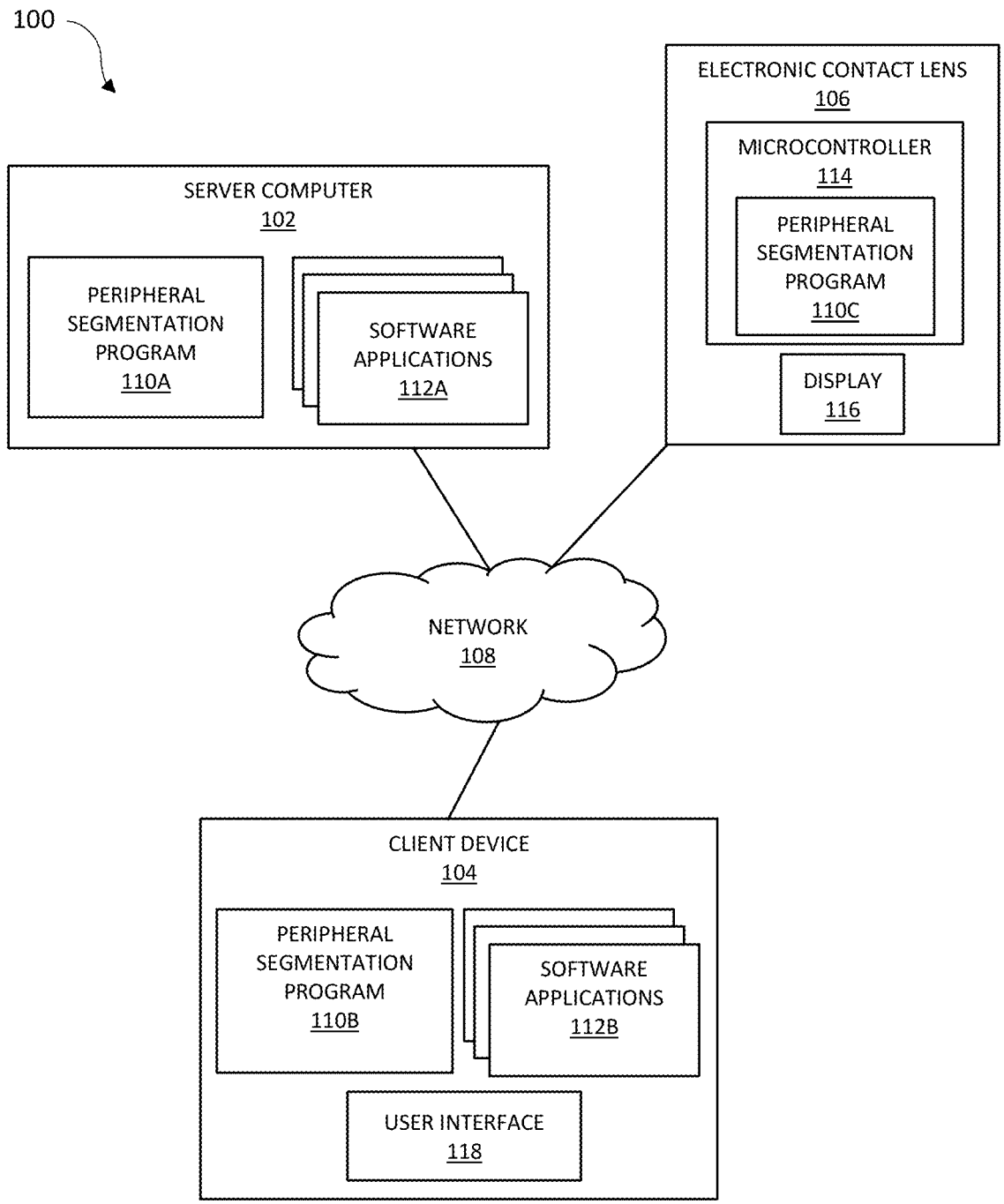
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, and electronic contact lens 106 all interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, electronic contact lens 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side peripheral segmentation program 110A and software applications 112A. Server computer 102 may include internal and external hardware components, as depicted and described in further detail with respect to FIG. 5.

Client device 104 can be a laptop computer, a tablet computer, a smart phone, smart watch, a smart speaker, or any programmable electronic device capable of communicating with various components and devices within the distributed data processing environment (e.g., server computer 102 and electronic contact lens 106), via network 108. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 108. In one embodiment, client device 104 represents one or more devices associated with a user. Client device 104 includes client-side peripheral segmentation program 110B and software applications 112B. Client device 104 also include an instance of user interface 118 for interacting with peripheral segmentation program 110A on server computer 102, peripheral segmentation program 110B, and peripheral segmentation program 110C on electronic contact lens 106.

Electronic contact lens 106, also referred to as smart contact lens, represent user wearable contact lens with integrated microcircuitry capable of displaying content to the user. Electronic contact lens 106 includes microcontroller 114 and display 116, where peripheral segmentation program 110C operating on microcontroller 112 manages content and peripheral segmentation on display 116. Microcontroller 114 can include a display control circuit for display 116, a communication and power conversion circuit for communicating via network 108 and managing an integrated power supply, and a sensor readout and control circuit for monitoring eye movement of the user wearing electronic contact lens 106. Display 116 allows for a user to access content in segmented areas in the peripheral view and view the content in the segmented areas and/or in the central vision area of electronic contact lens 106. An example of display 116 is a semitransparent display and microlens array is integrated into electronic contact lens 106 for viewing content. Electronic contact lens 106 can also include a power storage module, a solar cell module for charging the power storage module, a biosensor module for collecting data (e.g., tracking eye movement), and a communications and power module for communicating with server computer 102 and client device 104 via network 108 (not illustrated in FIG. 1).

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, client device 104, electronic contact lens 106, and other computing devices (not shown) within the distributed data processing environment.

Peripheral segmentation program 110 manages segmented areas in a peripheral view of display 116 on electronic contact lens 106. As previously discusses, client device 104 has the ability to communicate (i.e., pair) with electronic contact lens 106, where peripheral segmentation program 110B on client device 104 can receive various inputs from a user to manage how peripheral segmentation program 110C displays content on electronic contact lens 106. Peripheral segmentation program 110A operating on server computer 102 has the ability to communicate with peripheral segmentation program 110B and 110C to receive various data operational data regarding electronic contact lens. It is to be noted that one or more steps can be performed by each of peripheral segmentation program 110A, 110B, and 110C.

Peripheral segmentation program 110 initializes electronic contact lens 106 by pairing to electronic device 104 and determines a peripheral view for electronic contact lens 106 based on the user wearing electronic contact lens 106. Peripheral segmentation program 110 establishes segmented areas in the peripheral view for displaying content and establishes rules for accessing content in each of the segmented areas in the peripheral view of display 116 on electronic contact lens 106. Peripheral segmentation program 110 can receive one or more user inputs on client device 104 to establish the segmented areas and the rules for accessing the content in each of the segmented areas. Subsequently, peripheral segmentation program 110 minimizes the segmented areas in the peripheral view of display 116 of electronic contact lens 106, allowing a user of electronic contact lens 106 to focus on the surrounding areas (i.e., beyond the virtual reality content).

Responsive to peripheral segmentation program 110 determining the user is attempting to access content in a particular segmented area in the peripheral view of electronic contact lens 106, peripheral segmentation program 110 displays the content associated with the particular segmented area in a viewing area in display 116 of electronic contact lens 106. Peripheral segmentation program 110 performs an action based on a user input on client device 104 or electronic contact lens 106, on the content being displayed in the viewing area in display 116 of electronic contact lens 106. Subsequent to peripheral segmentation program 110 performing the action on the displayed content, peripheral segmentation program 110 determines whether the user is actively interacting with the segmented areas in the peripheral view in the viewing area in display 116 of electronic contact lens 106. In the event peripheral segmentation program 110 determines the user is actively interacting with the segmented areas in the peripheral view, peripheral segmentation program 110 continues displaying the content in the viewing area of electronic contact lens 106. In the event peripheral segmentation program 110 determines the user is no longer actively interacting with the segmented areas in the peripheral view, peripheral segmentation program 110 reverts back and minimizes the segmented areas in the peripheral view of display 116 of electronic contact lens 106.

Software applications 112A and 112B represent server-side and client-side software programs respectively, capable of displaying content in display 116 of electronic contact lens 106. Examples of software applications 112A and 112B include but are not limited to mapping software, social media platforms, word processor, media player, web browser, and an email client. User interface 118 enables a user to make requests of or issue commands to client device 104 and electronic contact lens 106 via network 108. User interface 118 also enables the user to receive information and instructions in response on client device 104 and electronic contact lens 106 via network 108. In one embodiment, a user of client device 104 accesses user interface 118 via voice commands in natural language. In one embodiment, user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 118 enables a user of client device 104 to interact with each instance of peripheral segmentation program 110A, 110B, and 110C operating on server computer 102, client device 104, and electronic contact lens 106, respectively.

Figure 2:
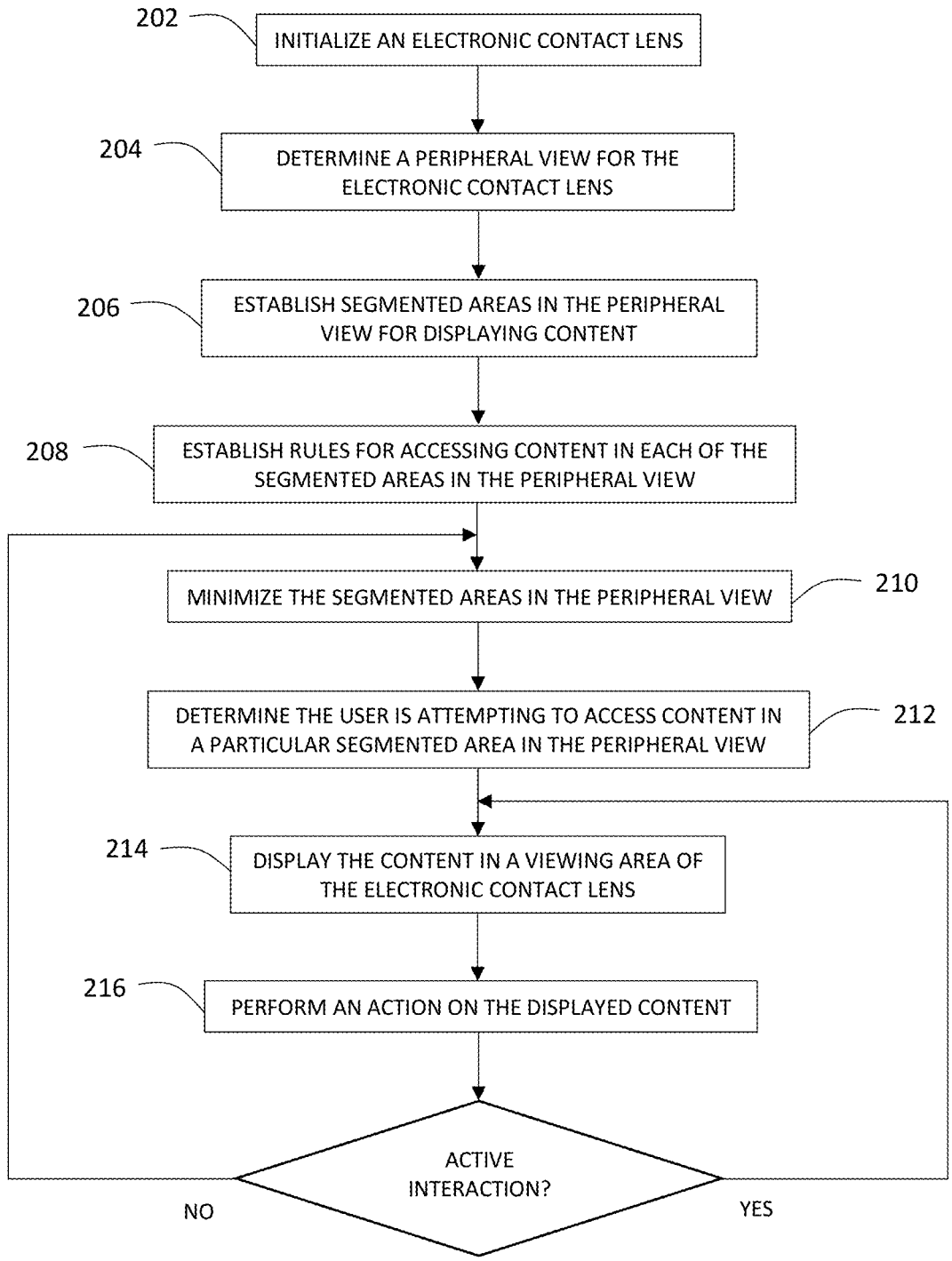
FIG. 2 represents a process flow of a peripheral segmentation program, in accordance with an embodiment of the present invention.

FIG. 2 represents a process flow of a peripheral segmentation program, in accordance with an embodiment of the present invention.

Peripheral segmentation program 110 initializes (202) an electronic contact lens. Peripheral segmentation program 110 utilizes one or more sensors on the electronic contact lens to detect when the electronic contact lens is being worn by a user. Peripheral segmentation program 110 initializes the electronic contact lens by pairing a client device (e.g., smart phone) associated with the user to the electronic contact lens, where a communications and power module on the electronic contact lens communicates with the client device via a network connection. Subsequently, peripheral segmentation program 110 determines whether a profile exists for the paired electronic contact lens, where the profile includes a determined peripheral view for the electronic contact lens, established segmented areas in the peripheral view for displaying content, and established rules for accessing content. For an instance where peripheral segmentation program 110 determines a profile exists for the electronic contact device, peripheral segmentation program 110 initializes the electronic contact lens by monitoring to determine whether the user is attempting to access content in a particular segmented area in the peripheral view (212). However, in this embodiment, peripheral segmentation program 110 determines a profile does not exist for the electronic contact device and peripheral segmentation program 110 initializes the electronic contact lens by establishing a profile for the electronic contact lens.

Peripheral segmentation program 110 determines (204) a peripheral view for the electronic contact lens. Peripheral segmentation program 110 determines the peripheral view for the electronic contact lens by determining a shape of an eye of the user wearing the electronic contact lens. Based on the determined shape of the eye of the user wearing the electronic contact lens, peripheral segmentation program 110 determines a central vision area and a peripheral area within a field of view area for the electronic contact lens. The field of view area of the electronic contact lens represents an area viewable and accessible by the user of electronic device. The field of view area includes the peripheral area surrounding the central vision area, discussed in further detail with regards to FIG. 4. Based on the peripheral area within the field of view area, peripheral segmentation program 110 determines the peripheral view for the electronic contact lens for accessing and displaying portions of content to the user. Peripheral segmentation program 110 allows for the user to adjust the boundaries of the peripheral view via eye movements as detected by electronic contact lens and/or user inputs on the paired client device.

For adjusting the boundaries of the peripheral view via eye movements as detected by electronic contact lens, peripheral segmentation program 110 can request the user trace an inner perimeter and an outer perimeter through eye movements captured by one or more sensors on the electronic contact device. Peripheral segmentation program 110 creates an outline of the peripheral view based on the traced inner and outer perimeter and thus, determines the peripheral view for the electronic contact lens based on the combined inner and outer perimeter. For adjusting the boundaries of the peripheral view via user inputs on the paired client device, peripheral segmentation program 110 can request the user trace an inner perimeter and an outer perimeter in a user interface on the paired client device. Peripheral segmentation program 110 can display the field of view area of the electronic contact lens in the user interface of the client device and the user can trace (e.g., user input on a touch screen) the inner perimeter and the outer perimeter of the peripheral area in the user interface of the paired client device. As the user traces the inner and outer perimeter, peripheral segmentation program 110 displays the tracing of the inner and outer perimeter in real time as the user provides the user input into the user interface on the client device. Peripheral segmentation program 110 creates an outline of the peripheral view based on the traced inner and outer perimeter and thus, determines the peripheral view for the electronic contact lens based on the combined inner and outer perimeter.

Peripheral segmentation program 110 establishes (206) segmented areas in the peripheral view for displaying content. Peripheral segmentation program 110 establishes the segmented areas in the peripheral view for displaying content based on the peripheral area as defined by the inner and outer perimeter. Peripheral segmentation program 110 allows for the user of electronic contact lens to customize the segmented areas in the peripheral view according to user preference. Peripheral segmentation program 110 receives a list of software applications, where peripheral segmentation program 110 associates each software application with a single segmented area. In one example, peripheral segmentation program 110 receives a list of four software applications and establishes four segmented areas corresponding to the list of fours software applications. Peripheral segmentation program 110 can establish four quadrants with equal areas in the peripheral view for displaying content associated with the four software application. Alternatively, peripheral segmentation program 110 can establish four quadrantes with varying areas in the peripheral view for displaying content, where for example, peripheral segmentation program 110 assigns a larger quadrant for an application that is accessed more frequently (e.g., messaging application) compared to the other applications (e.g., mapping software).

Peripheral segmentation program 110 allows for the user to adjust the boundaries of the segmented areas via eye movements as detected by electronic contact lens and/or user inputs on the paired client device. For adjusting the boundaries of the segmented areas via eye movements as detected by electronic contact lens, peripheral segmentation program 110 can request the user trace and/or point to a location in the peripheral view through eye movements captured by one or more sensors on the electronic contact device. Peripheral segmentation program 110 establishes each segmented area as the user traces and/or points to the location in the peripheral view. For adjusting the boundaries of the segmented areas via user inputs on the paired client device, peripheral segmentation program 110 can display a peripheral view of the electronic contact lens in a user interface on a paired client device and request the user trace and/or point to a location in the peripheral view. Peripheral segmentation program 110 establishes each segmented area as the user traces and/or points to the location in the peripheral view displayed in the user interface on the paired client device.

Peripheral segmentation program 110 establishes (208) rules for accessing content in each of the segmented areas in the peripheral view. Since each segmented area in the peripheral view is associated with a software application, peripheral segmentation program 110 allows for the user to establish rules for accessing content for the software application associated with each segmented area. The rules for accessing content defines how the user of the electronic device is to interact with the content for the software application in the associated segmented area of the electronic device. The rules dictate when content is not viewable in the segmented area (i.e., transparent for viewing the surround area), minimized in the segmented area, and expanded across a viewing area (i.e., peripheral and central vision areas). The rules further dictate how content for the software application accessed, whether it be through one or more eye movements and/or eye blinking, as captured by one or more sensors on the electronic contact lens.

In one example, a segmented area is associated with a messaging application, where peripheral segmentation program 110 establishes various rules for accessing the messaging application in the segmented area. During normal operations when the user is not interacting with the messaging application, peripheral segmentation program 110 does not display any content in the segmented area according to a first rule. Thus, the segmented area associated with the messaging application remains transparent and peripheral segmentation program 110 allows for user to view the surrounding area without displaying any content. If peripheral segmentation program 110 receives a message in the messaging application, peripheral segmentation program 110 displays a notification in the segmented area associated with the messaging application in the peripheral view according to a second rule. Peripheral segmentation program 110 accesses the content via eye movement directing a line of sight towards the segmented area as captured by one or more sensors on the electronic contact lens. Peripheral segmentation program 110 expands the message application in the associated segmented area or in the viewing area (i.e., peripheral and central vision areas) of the electronic contact lens based on a third rule as defined by the user of peripheral segmentation program 110.

In another example, a segmented area is associated with a mapping application, where peripheral segmentation program 110 establishes various rules for accessing the mapping application in the segmented area. During normal operations when the user is not interacting with the messaging application, peripheral segmentation program 110 does not display any content in the segmented area according to a first rule. Thus, the segmented area associated with the messaging application remains transparent and peripheral segmentation program 110 allows for user to view the surrounding area without displaying any content. If peripheral segmentation program 110 determines the mapping application was instructed to display navigational instructions (e.g., written text, directional arrows), peripheral segmentation program 110 displays the navigational instructions in the segmented area associated with the mapping application as a second rule. If a user is approaching an intersection requiring a change of direction or approaching a destination, peripheral segmentation program 110 displays the navigational instructions in the viewing area (i.e., peripheral and central vision areas) of the electronic contact lens as a third rule.

Peripheral segmentation program 110 minimizes (210) the segmented area in the peripheral view. Subsequent to establishing the rules for accessing content in each of the segmented area in the peripheral view, peripheral segmentation program 110 minimizes the content for the associated software applications in the segmented areas in the peripheral view to allow for the user wearing the electronic contact lens to have an unobstructed central vision area. Peripheral segmentation program 110 expands content for a segmented area in the peripheral into the central vision area based on one or more rules established in (208) and/or based on a determination that a user is attempting to accessing content in the particular area in the peripheral view (212). Though peripheral segmentation program 110 minimizes the segmented area in the peripheral view, peripheral segmentation program 110 can still display content in each of the segmented areas based on the previously established rules for each associated software application.

Peripheral segmentation program 110 determines (212) the user is attempting to access content in a particular segmented area in the peripheral view. In one embodiment, peripheral segmentation program 110 determines the user is attempting to access content in a particular segmented area in the peripheral view based on one or more eye movements of the user as captured by one or more sensors of the electronic contact lens. In one example, peripheral segmentation program 110 determines the user is attempting to access content in an upper left quadrant of the peripheral view based on the one or more sensors of the electronic contact lens detecting that the user is directing their vision towards the upper left quadrant for an amount of time that exceeds a determined amount of time (e.g., 3 seconds). The determined amount of amount of time prevents peripheral segmentation program 110 from pre-emptively determining the user is attempting to access content in a particular segmented area in the peripheral view, if the user is inadvertently directing their vision towards the upper left quadrant. In another embodiment, peripheral segmentation program 110 determines the user is attempting to access content in a particular segmented area in the peripheral view based on a number of eye blinking motions in a given amount of time. In one example, peripheral segmentation program 110 determines the user attempting to access content in a lower right quadrant of the peripheral view based on one or more sensors of the electronic contact lens detecting two eye blinking motions in a determined amount of time (e.g., 0.5 seconds). In another example, peripheral segmentation program 110 determines the user is attempting to access content in a lower left quadrant of the peripheral view based on one or more sensors of the electronic contact lends detecting three eye blinking motion in a determined amount of time (e.g., 0.5 seconds).

In yet another embodiment, peripheral segmentation program 110 determines the user is attempting to access content in the particular segmented area in the peripheral view based on one or more user inputs on a client device paired to the electronic contact lens. Peripheral segmentation program 110 receives the user input on the client device in a software application, where the software application is associated with the particular segmented area. In one example, a user receives a message in a software messaging application, where a notification for the message is displayed in a user interface on a client device. Peripheral segmentation program 110 determines the user is attempting to view the receive message (i.e., access content) in the particular segmented area in the peripheral view rather than in the user interface on the client device based on peripheral segmentation program 110 receiving a user input to display the content associated with the particular segmented view.

Peripheral segmentation program 110 displays (214) the content in a viewing area of the electronic contact lens. Peripheral segmentation program 110 can display the content associated with the particular software application in the viewing area of the electronic contact lens that includes the peripheral and central vision areas. Alternatively, peripheral segmentation program 110 can display the content associated with the particular software application in the particular segmented area and/or in the central vision area of the electronic contact lens. In one example, peripheral segmentation program 110 displays a message received in a software application, where the message is viewable by the user of the electronic contact lens. In another example, Peripheral segmentation program 110 display a list of navigational instructions associated with a mapping application, where the user of the electronic contact lens can view the list of navigation instructions for traveling to a particular destination.

Peripheral segmentation program 110 performs (216) an action on the displayed content. Peripheral segmentation program 110 performs an action on the displayed content based one or more eye movements as captured one or more sensors on the electronic contact lens and/or one or more inputs by a user on a client device paired to the electronic contact lens. Peripheral segmentation program 110 can utilize the segmented areas of the peripheral view as selections for performing an action on the displayed content. In one example, where peripheral segmentation program 110 displays the message received in the software application, peripheral segmentation program 110 displays one or more actions in one or more quadrants of the segmented areas selectable via an eye movement by a user of the electronic contact lens. An eye movement to a lower left quadrant of the segmented areas performs a message reply, where a user can dictate a reply message to the received text message and a paired client device can captured the dictated reply message for responding to the received message. An eye movement to a lower right quadrant of the segmented areas performs a message close function, where the user does not respond to the received message and peripheral segment program 110 ceases to display the received message.

In another example, where peripheral segment program 110 displays the list of navigation instructions associated with the mapping application, peripheral segment program 110 display one or more action in one or more quadrants of the segmented areas selectable via an eye movement by a user of the electronic contact lens. An eye movement to an upper right quadrant of the segmented areas allows for the user to scroll up the list of navigational instructions and an eye movement to the lower right quadrant of the segmented areas allows for the user to scroll down the list of navigational instructions. Peripheral segment program 110 has the ability to monitor how the user interacts with the various software applications in each of the segmented areas and adjust positioning in the peripheral view, the content being displayed, a size and shape of the established segmented areas, and one or more of the established rules for accessing content in each of the segmented areas in the peripheral view.

Peripheral segmentation program 110 determines whether the user is actively interacting with the segmented areas in the peripheral view (decision 218). In the event peripheral segmentation program 110 determines the user is actively interacting with the segmented areas in the peripheral view ("yes" branch, decision 218), peripheral segmentation program 110 continues displaying (214) the content in the viewing area of the electronic contact lens. In the event peripheral segmentation program 110 determines the user is no longer actively interacting with the segmented areas in the peripheral view ("no" branch, decision 218), peripheral segmentation program 110 reverts back and minimizes (210) the segmented areas in the peripheral view.

In one embodiment, peripheral segmentation program 110 determines the user is no longer actively interacting with the segmented areas based on peripheral segmentation program 110 not receiving a user input through one or more eye movements and/or the paired client device in a determined amount of time (e.g., 5 seconds). In another embodiment, peripheral segmentation program 110 determines the user is no longer actively interacting with the segmented areas based on peripheral segmentation program 110 receiving a user input through one or more eye movements and/or the paired client device to minimize the content into the segmented areas in the peripheral view. As previously discussed, an action to minizine the content into the segmented areas in the peripheral view can be associated with a quadrant of the segmented area selectable via an eye movement by a user of the electronic contact lens.

Figure 3A:
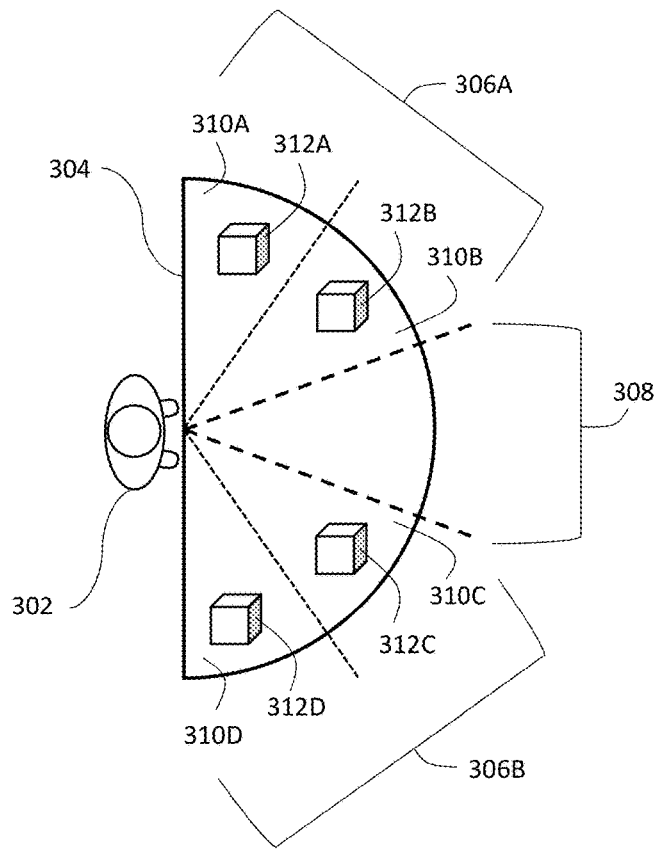
FIG. 3A illustrates an overhead view of a peripheral segmentation program displaying content in segmented areas, in accordance with an embodiment of the present invention.

FIG. 3A illustrates an overhead view of a peripheral segmentation program displaying content in segmented areas, in accordance with an embodiment of the present invention. In this example, peripheral segmentation program 110 initializes an electronic contact lens being worn by user 302 and establishes viewing area 304 for user 302 that includes left peripheral area 306A, right peripheral area 306B, and central vision area 308. Peripheral segmentation program 110 establishes four segmented areas 310A, 310B, 310C, and 310D for displaying content associated with software application icons 312A, 312B, 312C, and 312D, respectively. Segmented areas 310A and 310B are located in left peripheral area 306A and segmented areas 310C and 310D are located in right peripheral area 306B. In this example, segmented areas 310A, 310B, 310C, and 310D are of equal areas, where segmented area 310A is located in the $0°≤x<20°$ horizontal range, segmented area 310B is located in the $20°≤x<40°$ horizontal range, segmented area 310C is located in $140°<x≤160°$ horizontal range, and segmented area 310D is located in the $160°<x≤180°$ horizontal range. The $40°≤x≤140°$ horizontal range represents central vision area 308 of user 302 and 90° representing a center line for central vision area 308, where peripheral segmentation program 110 does not associate any software application with central vision area 308. Peripheral segmentation program 110 allows for user 302 to customize each horizontal range associated with segmented areas 310A, 310B, 310C, and 310D, thus resulting in an expansion or reduction of the horizontal range of central vision area 308. It is to be noted that peripheral segmentation program 110 provides an adjustable depth to each software application icon 312A, 312B, 312C, and 312D, resulting in a 3-dimensional appearance when user 302 looks towards segmented areas 310A, 310B, 310C, and 310D, respectively.

In one example, user 302 provides eye movement outside of the $40°≤x≤140°$ horizontal range representing central vision area 308 and into the $20°≤x<40°$ horizontal range. Peripheral segmentation program 110 determines user 302 is attempting to access content in segmented area 310B in left peripheral view 306A based on the eye movement into the 20°≤x<40° horizontal range, where user 302 maintains the eye movement in the 20°≤x<40° horizontal range for a determined amount of time (e.g., 3 seconds). Subsequently, peripheral segmentation program 110 displays content for the software application associated software application icon 312B in viewing area 304. In another example, user 302 provides eye movement outside of the 40°≤x≤140° horizontal range representing central vision area 308 and into the 160°<x≤180° horizontal range. Peripheral segmentation program 110 determines user 302 is attempting to access content in segmented area 310D in right peripheral view 306B based on the eye movement into the 160°<x≤180° horizontal range, where user 302 maintains the eye movement in the 160°<x≤180° horizontal range for a determined amount of time (e.g., 3 seconds). Subsequently, peripheral segmentation program 110 displays content for the software application associated software application icon 312B in one or more of central vision area 308 and segmented areas 310A, 310B, 310C, and 310D.

Figure 3B:
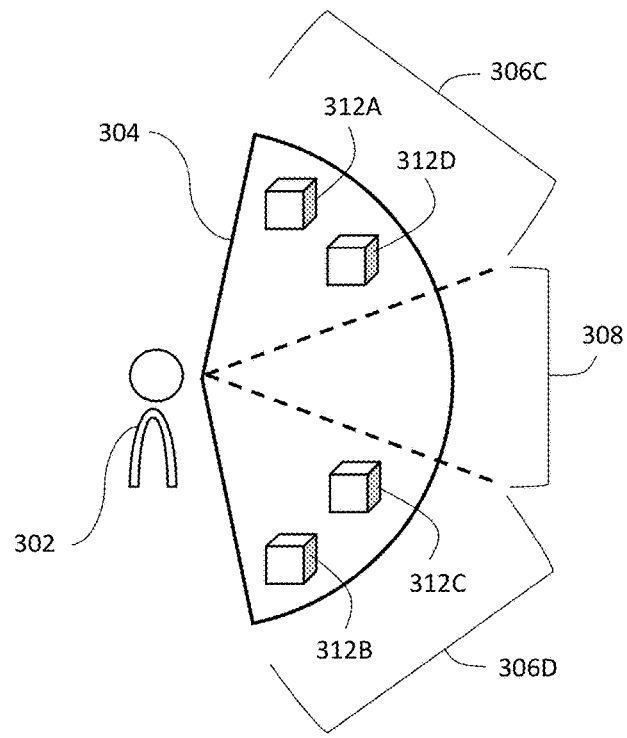
FIG. 3B illustrates a side view of a peripheral segmentation program displaying content in segmented areas, in accordance with an embodiment of the present invention.

FIG. 3B illustrates a side view of a peripheral segmentation program displaying content in segmented areas, in accordance with an embodiment of the present invention. Expanding upon the example discussed with regards to FIG. 3A, software application icons 312A and 312C are located in upper peripheral area 306C and software applications icons 312B and 312D are located in lower peripheral area 306D. Upper peripheral area 306C is defined by vertical range 0°≤x<50° and lower peripheral area 306D is defined by vertical range 100°<x≤150°, with central vision area 308 separating upper peripheral area 306C and lower peripheral area 306D with defined vertical range 50°≤x≤100°. As a result, software application 312A is located in the upper left quadrant, software application 312B is located in the lower left quadrant, software application 312C is located in the lower right quadrant, and software application 312D is located in the upper right quadrant.

In one example, user 302 attempts to access a software application associated with software application icon 312A, where user 302 directs eye movement to the upper left quadrant. The upper left quadrant for software application icon 312A is defined by the 0°≤x<20° horizontal range and the 0°≤x<50° vertical range, where user 302 maintains eye movement in the upper left quadrant for a determined amount of time (e.g., 4 seconds). Peripheral segmentation program 110 determines user 302 is attempting to access content in the upper left quadrant and displays the content for the software application associated with software icon 312A in viewing area 304. In another example, user attempts to access a software application associated with software icon 312C, where user 302 directs eye movement to the lower right quadrant. The lower right quadrant for software application icon 312C is defined by 140°<x≤160° horizontal range and 100°<x≤150° vertical range, where user 302 maintains eye movement in the lower right quadrant for a determined amount of time (e.g., 4 seconds). Peripheral segmentation program 110 determines user 302 is attempting to access content in the lower right quadrant and displays the content for the software application associated with software icon 312C in one or more of central vision area 308 and segmented areas 310A, 310B, 310C, and 310D (not illustrated in FIG. 3B).

Figure 4:
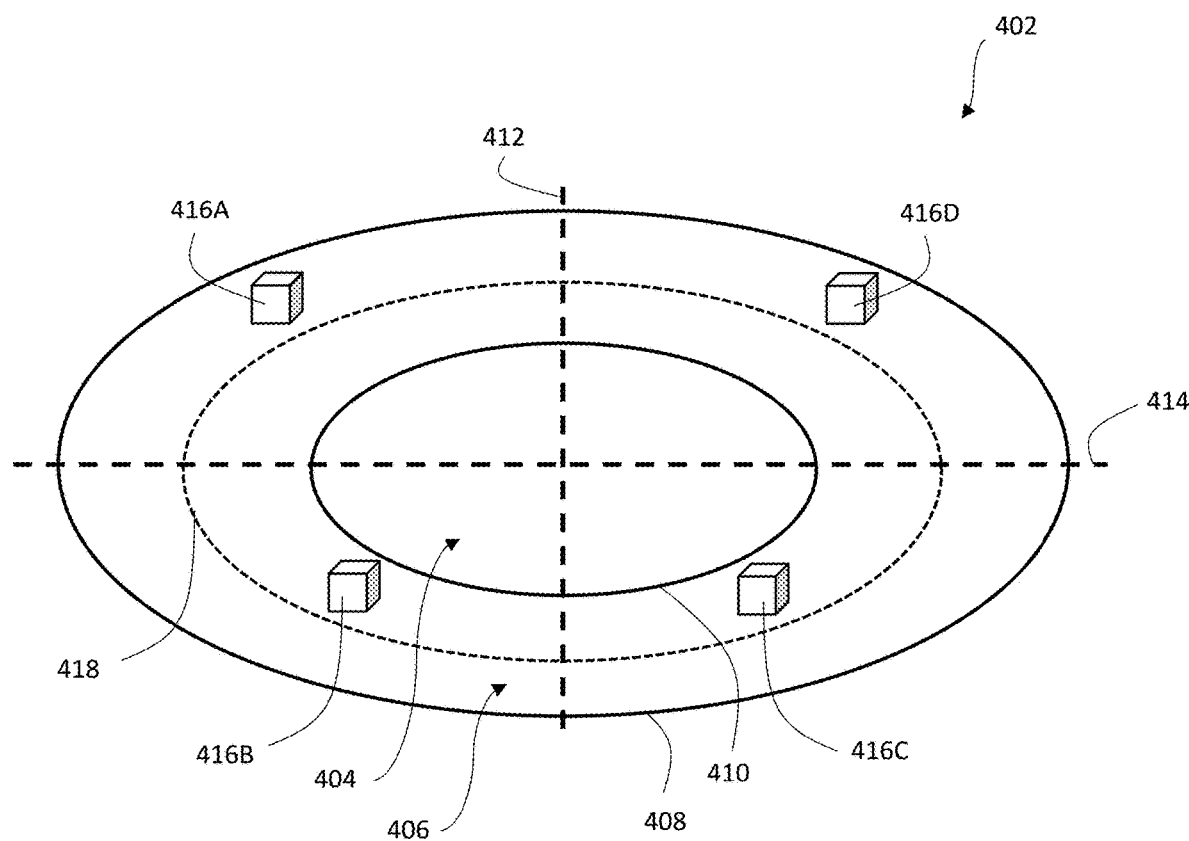
FIG. 4 illustrates a first-person perspective view of a peripheral segmentation program displaying content in segmented areas, in accordance with an embodiment of the present invention.

FIG. 4 illustrates a first-person perspective view of a peripheral segmentation program displaying content in segmented areas, in accordance with an embodiment of the present invention. In this first-person perspective, viewing area 402 is includes by central vision area 404 and peripheral area 406, where peripheral area 406 includes outer perimeter 408 and inner perimeter 410, which also defines central vision area 404. Viewing area 402 is separated into four quadrants by vertical axis 412 and horizontal axis 414, where software application icon 416A is located in the upper left quadrant, software application icon 416B is located in the lower left quadrant, software application icon 416C is located in the lower right quadrant, and software application icon 416D is located in the upper right quadrant. Furthermore, peripheral segmentation program 110 establishes two segmented areas for displaying content (e.g., software application icon 416) in each of the four quadrants, where the two segmented areas are separated by line 418. Therefore, peripheral segmentation program 110 has the ability to display four addition software application icon for accessing content, in addition to the four software application icons 416A, 416B, 416C, and 416D. Peripheral segmentation program 110 can track the eye movement of the user through one or more sensors on the electronic contact lens to determine when a line of sight for the eye has shifted from central vision area 404 towards the upper left quadrant in peripheral area 406 with software application icon 416A for a determined amount of time (e.g., 3 seconds). Subsequently, peripheral segmentation program 110 displays content associated with software application icon 416A (e.g., messaging application, mapping application) in viewing area 404. Alternatively, peripheral segmentation program 110 displays content associated with software application icon 416A in one or more of central vision area 404 and the four quadrants of peripheral area 406.

Figure 5:
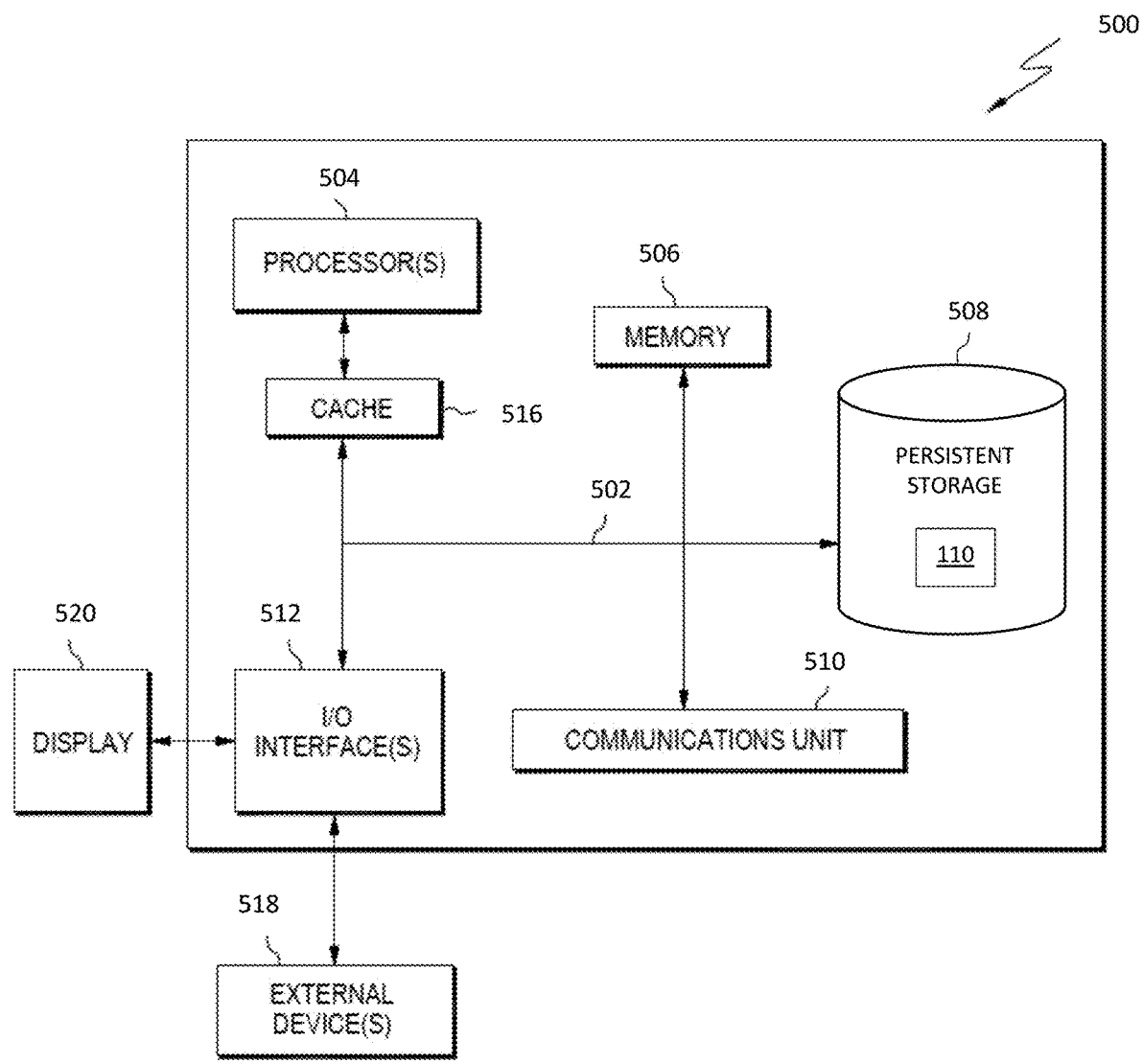
FIG. 5 is a block diagram of components of a computer system, such as the server computer of FIG. 1, in accordance with an embodiment of the present invention.

FIG. 5 depicts computer system 500, where server computer 102, client device 104, and electronic contact lens 106 is an example of a computer system 500 that includes an instance of peripheral segmentation program 110. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
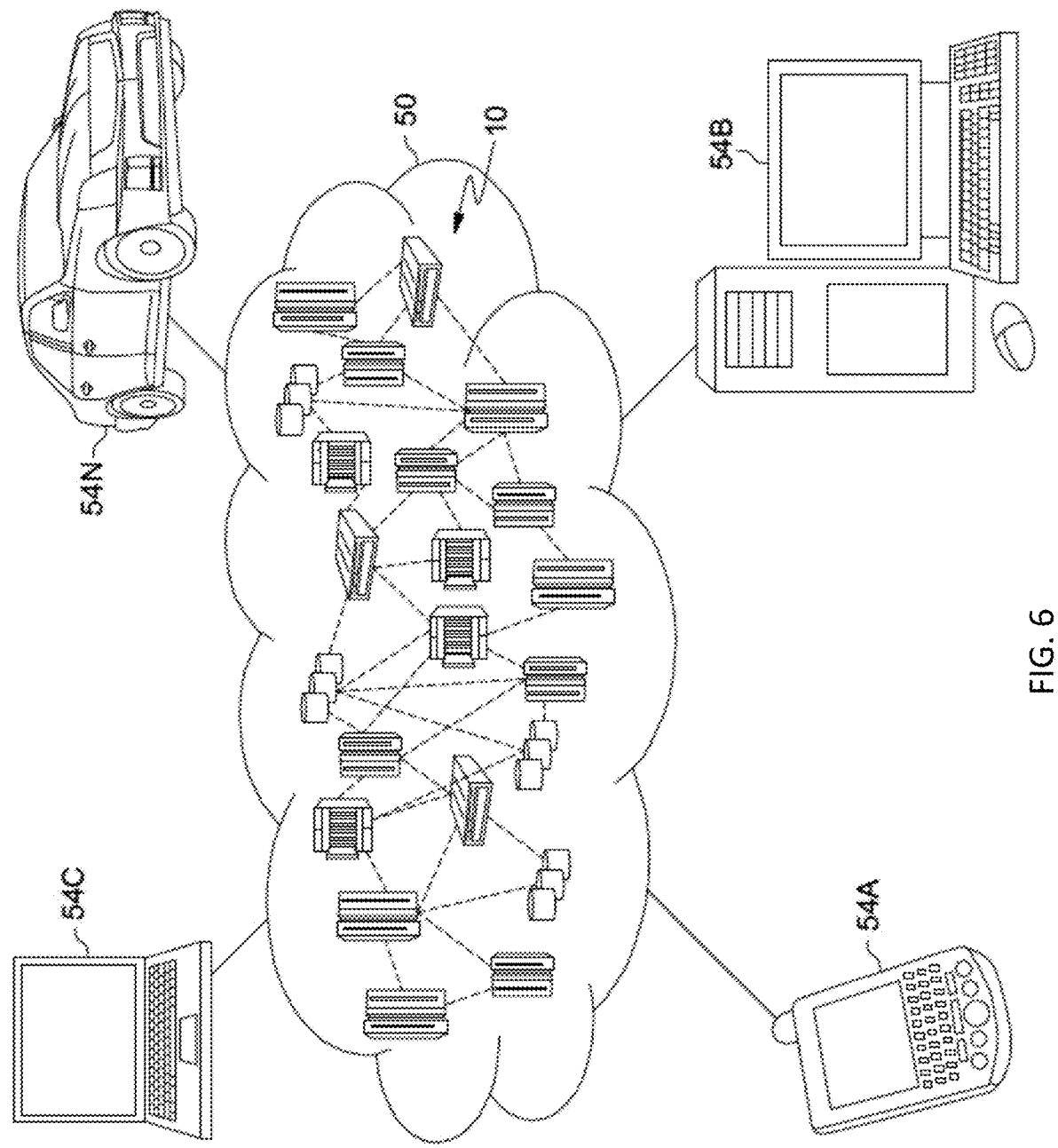
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
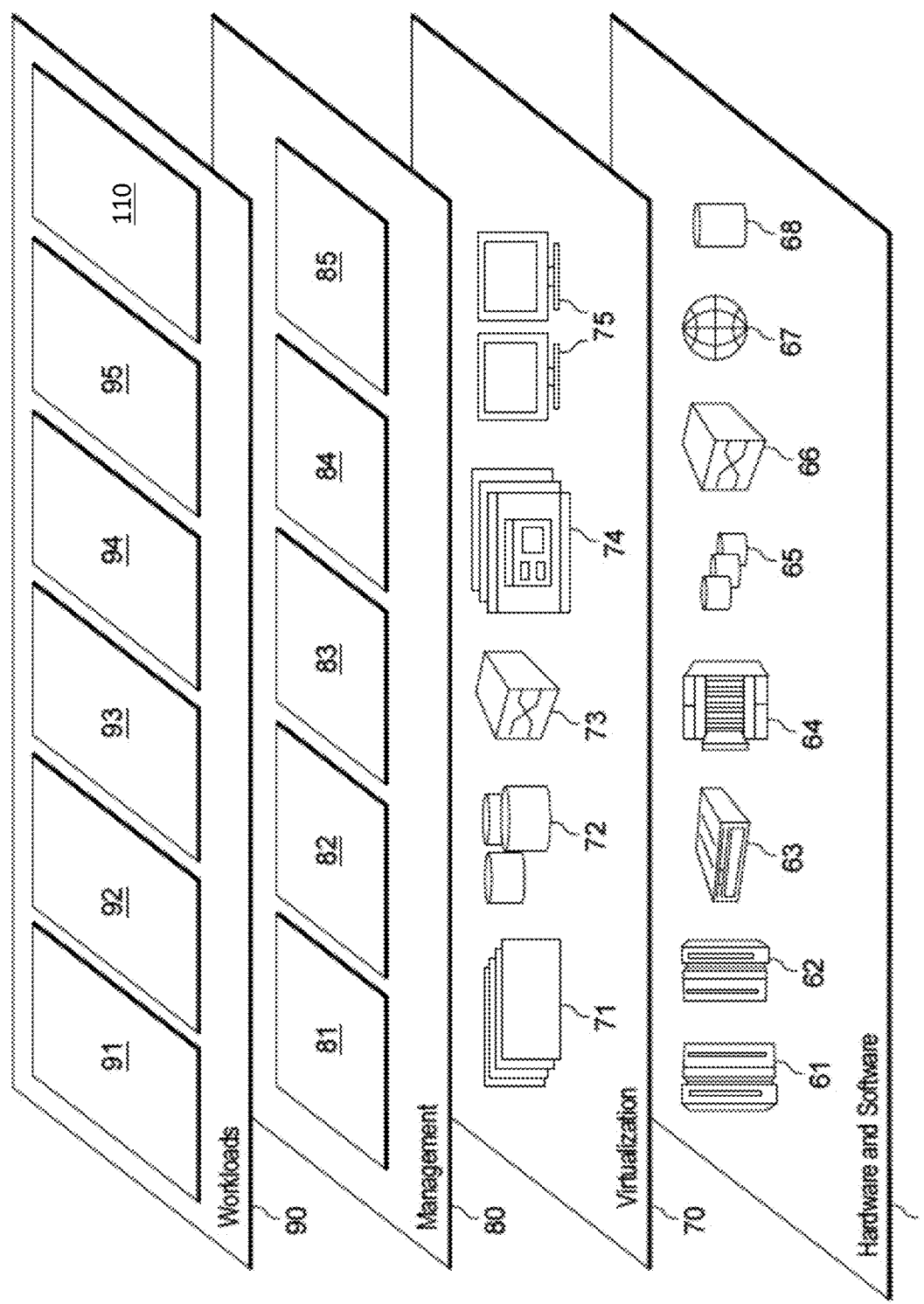
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and peripheral segmentation program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    responsive to initializing an electronic contact lens, determining a peripheral view for the electronic contact lens based on a user associated with the electronic contact lens;
    establishing a plurality of segmented areas in the peripheral view of an electronic contact lens, wherein each of the plurality of segmented areas in the peripheral view is associated with a software application from a plurality of software applications;
    establishing a plurality of rules for accessing content of each software application from the plurality of software applications associated with the plurality of segmented areas;
    determining the user of the electronic contact lens is attempting to access content of a first software application from the plurality of software applications associated with a first segmented area from the plurality of segmented areas of the electronic contact lens;
    responsive to displaying, in the electronic contact lens, the content of the first software application, performing an action on the content of the first software application.

2. The computer-implemented method of claim 1, wherein performing the action on the content of the first software application further comprises:
    capturing, by one or more sensors of the electronic contact lens, an eye input associated with a second segmented area from the plurality of segmented areas, wherein the second segmented area is associated with performing the action on the content in the first software application; and
    responsive to determining the eye input associated with the second segmented area from the plurality of segmented areas exceeds a determined amount of time, performing the action associated with the second segmented area on the content in the first software application.

3. The computer-implemented method of claim 2, wherein the eye input associated with the second segmented area is selected from a group consisting of: an eye movement directing a line of sight towards the second segmented area and a number of eye blinks associated with the second segmented area.

4. The computer-implemented method of claim 1, wherein determining the user of the electronic contact lens is attempting to access the content of the first software application further comprises:
    capturing, by one or more sensors of the electronic contact lens, an eye input associated with the first segmented area from the plurality of segmented areas; and
    responsive to determining the eye input associated with the first segmented area from the plurality of segmented areas exceeds a determined amount of time, determining the user of the electronic contact lens is accessing the content of the first software application.

5. The computer-implemented method of claim 4, wherein the eye input associated with the first segmented area is selected from a group consisting of: an eye movement directing a line of sight towards the first segmented area and a number of eye blinks associated with the first segmented area.

6. The computer-implemented method of claim 1, further comprising:
displaying, in a viewing area of the electronic contact lens, the content of the first software application, wherein the viewing area includes a central vision area and a peripheral view area.

7. The computer-implemented method of claim 1, further comprising:
displaying, in one or more of a central vision area and one or more segmented areas from the plurality of segmented areas of the electronic contact lens, the content of the first software application.

8. A computer program product comprising one or more non-transitory computer readable storage media and program instructions collectively stored on the one or more non-transitory computer readable storage media, the stored program instructions executable by one or more computer processors, the stored program instructions comprising:
program instructions to, responsive to initializing an electronic contact lens, determine a peripheral view for the electronic contact lens based on a user associated with the electronic contact lens;
program instructions to establish a plurality of segmented areas in the peripheral view of an electronic contact lens, wherein each of the plurality of segmented areas in the peripheral view is associated with a software application from a plurality of software applications;
program instructions to establish a plurality of rules for accessing content of each software application from the plurality of software applications associated with the plurality of segmented areas;
program instructions to determine the user of the electronic contact lens is attempting to access content of a first software application from the plurality of software applications associated with a first segmented area from the plurality of segmented areas of the electronic contact lens;
program instructions to, responsive to displaying, in the electronic contact lens, the content of the first software application, performing an action on the content of the first software application.

9. The computer program product of claim 8, wherein performing the action on the content of the first software application, further comprises the stored program instructions:
program instructions to capture, by one or more sensors of the electronic contact lens, an eye input associated with a second segmented area from the plurality of segmented areas, wherein the second segmented area is associated with performing the action on the content in the first software application; and
program instructions to, responsive to determining the eye input associated with the second segmented area from the plurality of segmented areas exceeds a determined amount of time, perform the action associated with the second segmented area on the content in the first software application.

10. The computer program product of claim 9, wherein the eye input associated with the second segmented area is selected from a group consisting of: an eye movement directing a line of sight towards the second segmented area and a number of eye blinks associated with the second segmented area.

11. The computer program product of claim 8, wherein determining the user of the electronic contact lens is attempting to access the content of the first software application further comprises the stored program instructions:
program instructions to capture, by one or more sensors of the electronic contact lens, an eye input associated with the first segmented area from the plurality of segmented areas; and
program instructions to, responsive to determining the eye input associated with the first segmented area from the plurality of segmented areas exceeds a determined amount of time, determine the user of the electronic contact lens is accessing the content of the first software application.

12. The computer program product of claim 11, wherein the eye input associated with the first segmented area is selected from a group consisting of: an eye movement directing a line of sight towards the first segmented area and a number of eye blinks associated with the first segmented area.

13. The computer program product of claim 8, the stored program instructions further comprising:
program instructions to display, in a viewing area of the electronic contact lens, the content of the first software application, wherein the viewing area includes a central vision area and a peripheral view area.

14. The computer program product of claim 8, the stored program instructions further comprising:
program instructions to display, in one or more of a central vision area and one or more segmented areas from the plurality of segmented areas of the electronic contact lens, the content of the first software application.

15. A computer system comprising:
one or more computer processors;
one or more computer readable storage media; and
program instructions stored on the computer readable storage media for execution by at least one of the one or more computer processors, the program instructions comprising:
program instructions to, responsive to initializing an electronic contact lens, determine a peripheral view for the electronic contact lens based on a user associated with the electronic contact lens;
program instructions to establish a plurality of segmented areas in the peripheral view of an electronic contact lens, wherein each of the plurality of segmented areas in the peripheral view is associated with a software application from a plurality of software applications;
program instructions to establish a plurality of rules for accessing content of each software application from the plurality of software applications associated with the plurality of segmented areas;
program instructions to determine the user of the electronic contact lens is attempting to access content of a first software application from the plurality of software applications associated with a first segmented area from the plurality of segmented areas of the electronic contact lens;
program instructions to, responsive to displaying, in the electronic contact lens, the content of the first software application, performing an action on the content of the first software application.

16. The computer system of claim 15, wherein performing the action on the content of the first software application, further comprises the stored program instructions:

program instructions to capture, by one or more sensors of the electronic contact lens, an eye input associated with a second segmented area from the plurality of segmented areas, wherein the second segmented area is associated with performing the action on the content in the first software application; and program instructions to, responsive to determining the eye input associated with the second segmented area from the plurality of segmented areas exceeds a determined amount of time, perform the action associated with the second segmented area on the content in the first software application.

17. The computer system of claim 16, wherein the eye input associated with the second segmented area is selected from a group consisting of: an eye movement directing a line of sight towards the second segmented area and a number of eye blinks associated with the second segmented area.

18. The computer system of claim 15, wherein determining the user of the electronic contact lens is attempting to access the content of the first software application further comprises the stored program instructions:

program instructions to capture, by one or more sensors of the electronic contact lens, an eye input associated with the first segmented area from the plurality of segmented areas; and program instructions to, responsive to determining the eye input associated with the first segmented area from the plurality of segmented areas exceeds a determined amount of time, determine the user of the electronic contact lens is accessing the content of the first software application.

19. The computer system of claim 18, wherein the eye input associated with the first segmented area is selected from a group consisting of: an eye movement directing a line of sight towards the first segmented area and a number of eye blinks associated with the first segmented area.

20. The computer system of claim 15, the stored program instructions further comprising:

program instructions to display, in a viewing area of the electronic contact lens, the content of the first software application, wherein the viewing area includes a central vision area and a peripheral view area.

* * * * *